UNITED STATES PATENT OFFICE.

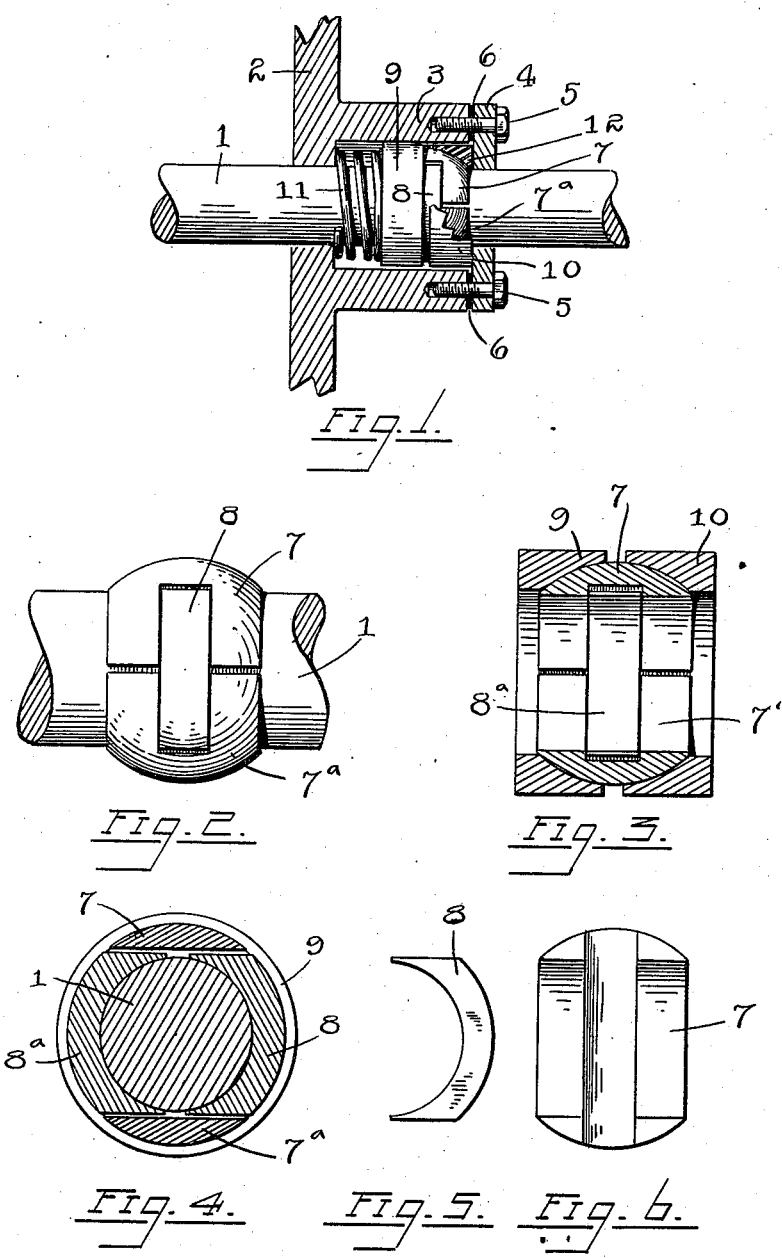

WILLIAM HOEY, OF GRAND RAPIDS, MICHIGAN.

METALLIC PISTON-ROD PACKING.

1,008,644.  Specification of Letters Patent.  Patented Nov. 14, 1911.

Application filed December 5, 1910. Serial No. 595,700.

*To all whom it may concern:*

Be it known that I, WILLIAM HOEY, a citizen of the United States of America, residing at Grand Rapids, in the county of Kent and State of Michigan, have invented certain new and useful Improvements in Metallic Piston-Rod Packings; and I do hereby declare the following to be a full, clear, and exact description of the invention, such as will enable others skilled in the art to which it appertains to make and use the same.

My invention relates to improvements in metallic piston rod packings, and its object is to provide the same with various new and useful features, hereinafter more fully described, and particularly pointed out in the claims, reference being had to the accompanying drawings, in which:

Figure 1 represents a packing gland, a section of a steam engine cylinder head in vertical section, and a portion of the piston rod with my improved metallic packing in operative position; Fig. 2 shows my improved packing and a portion of the piston rod detached with the packing rings and spring removed; Fig. 3 a vertical section of my packing; Fig. 4 a transverse vertical section of the packing with the piston rod in place. Fig. 5 shows one of the two small segments of the packing members; and, Fig. 6 a plan view of one of the two hemispherical packing members.

Like numbers refer to like parts in all of the figures.

1 represents the piston rod of any engine; 2 the cylinder head, and 3 a packing gland as usually constructed, when metallic packings are used.

My improved packing consists of a globular body preferably made of a soft metal, and divided through the center into two equal parts 7 and 7ª, which are spaced apart, and have an opening through their axes adapted to closely fit around the piston rod 1. This globular body composed of the parts 7 and 7ª, is provided with a transverse opening adapted to receive two slidable detached segmental members 8 and 8ª made from a soft metal, which members also closely engage the piston rod 1 at their inner sides, are also carried by the steam against the wall of the opening and are also spaced apart at the top and bottom from the members 7 and 7ª, so that these members 7 and 7ª will have room to close in on the piston rod as they wear away.

9 and 10 are concave members of hard metal which loosely surround the piston rod and are provided with cup shaped openings to fit over the members 7, 7ª, 8, and 8ª, forming a steam tight joint between their concave surfaces and the convex surfaces of the said parts 7, 7ª, 8, and 8ª and hold them in operative position. The member 10 engages the head 4 of the packing gland and forms a steam tight joint at 12, the face of the member 10 and the inner face of the head 4 being ground where the two engage each other. A spring 11 is interposed between the bottom of the packing gland and the member 9, and forces the said member against the packing, holding it securely in place and forcing the parts by virtue of their globular shape and the cup shaped openings in the packing rings tightly against the piston rod, the packing rings 9 and 10 being at all times spaced apart.

A packing 6 is interposed between the packing gland 3 and its head 4, which prevents escape of steam from the gland, the head being held in position by cap screws 5.

It will be seen that the steam which enters the packing gland will entirely surround this metallic packing, but is prevented from escaping through the head of the gland by the packing 6 and the ground joint at 12. Neither can it escape through the packing around the piston rod 1, as the several parts of which the globular packing is composed, are held in close contact with the piston rod and with each other and prevent any escape of steam through them. It will be seen that as the soft metal of which this packing is made wears away, the packing ring 9 will be forced farther upon the packing by means of the spring 11, and when the engine is working by the steam pressure, thus holding it continuously in close contact with the piston rod. It will also be noticed that this packing automatically conforms to the alinement of the piston rod.

What I claim is:—

1. A metallic piston rod packing, comprising a globular body having an axial opening for the piston rod divided in the plane of the axis and spaced apart, said body also having openings transverse to the axis thereof, detached segmental members in said openings extending partially within each division and across the space therebetween, and means for holding said body and segments in contact with a piston rod.

2. A metallic piston rod packing, consisting of a body having oppositely inclined ends and also having an axial opening and divided in the plane of the axis, detached segmental members each extending partially within each part of said body and transversely of said axial opening, rings having inclined surfaces oppositely engaging said ends, and a spring to yieldingly force said rings toward each other.

3. A metallic piston rod packing, comprising a globular body having an axial opening extending therethrough and also divided in the plane of the axis into two equal parts spaced apart and also having transverse openings in each part, detached segmental members in said openings extending partially in each part of said body and across the space therebetween, rings having concave surfaces to engage the respective ends of said body, a casing to contain said packing, and a spring in said casing to force the rings toward each other.

In testimony whereof I affix my signature in presence of two witnesses.

WILLIAM HOEY.

Witnesses:
JAMES B. HOEY,
LUTHER V. MOULTON.

Copies of this patent may be obtained for five cents each, by addressing the "Commissioner of Patents, Washington, D. C."